United States Patent Office 3,574,702
Patented Apr. 13, 1971

3,574,702
PROCESS FOR DIMERIZING ACRYLONITRILE COMPOUNDS
Julian Feldman and Bernard A. Saffer, Cincinnati, Ohio, assignors to National Distillers and Chemical Corporation, New York, N.Y.
No Drawing. Continuation-in-part of application Ser. No. 271,463, Apr. 8, 1963. This application Mar. 2, 1965, Ser. No. 436,648
Int. Cl. C07c 121/20
U.S. Cl. 260—465.8
8 Claims

ABSTRACT OF THE DISCLOSURE 2-methyleneglutaronitrile is prepared via tertiary phosphine catalyzed dimerization of acrylonitrile.

The present application is a continuation-in-part of Ser. No. 271,463, filed Apr. 8, 1963.

This invention relates to an improved dimerization process. More particularly, the invention pertains to an improved process for the dimerization of acrylonitrile to produce 2-methylene glutaronitrile.

The parent application describes a catalytic process for the dimerization of acrylonitrile compounds to form unsaturated dinitriles. Utilizing acrylonitrile as the starting material, the dimer product is 2-methylene glutaronitrile having the following formula:

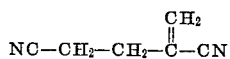

The unique structure of this compound enables it to undergo special addition polymerization and copolymerization reactions. The 2-methylene glutaronitrile is also capable of being selectively hydrogenated to prepare various intermediates as well as diamines and dibasic acids.

The process proposed heretofore involves, in general, dimerizing acrylonitrile compounds, and especially acrylonitrile itself, in the presence of an inert solvent at moderate temperatures using as catalysts tertiary phosphines or adducts of tertiary phosphines with zerovalent nickel catalysts derived from nickel carbonyl to form the unsaturated dinitrile products. Various trialkyl phosphines, tricycloalkyl phosphines, and mixed alkyl aryl phosphines were disclosed in the parent application. The preferred phosphine catalysts were stated to be the trialkyl phosphines or the mixed dialkyl aryl phosphines in which the alkyl group has from about 4 to 8 carbon atoms. The disclosed organic solvents included benzene, xylene, dimethylformamide, acetonitrile and the like. The use of acetonitrile as the preferred solvent was also taught. The parent application further disclosed that an aliphatic alcohol might be employed in the reaction mixture and indicated that isopropanol was preferred although other alcohols would also be suitable.

One object of the present invention is to provide an improved process for the dimerization of acrylonitrile compounds to give increased conversions and yields of the desired unsaturated dinitrile products.

Another object of the present invention is to provide an improved dimerization process involving certain specific operating conditions wherein increased conversions and yields of the desired unsaturated dinitrile products are attained.

A further object of the present invention is to provide an improved process for the dimerization of acrylonitrile with increased conversions and yields of 2-methylene glutaronitrile.

These and other objects of the invention will become readily apparent from the ensuing description and illustrative embodiments.

In accordance with the present invention, it has now been found that particularly outstanding conversions and yields of the unsaturated dinitriles can be achieved by dimerizing acrylonitrile compounds in the presence of a phosphine catalyst having the formula

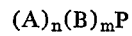

wherein

A is an aryl group having from 6 to 12 carbon atoms, preferably 6 to 9 carbon atoms, and includes such aryl groups as phenyl, tolyl, xylyl, ethyl phenyl, cumyl, biphenyl, etc.;

B is either a straight or branched chain alkyl group having from 2 to 12 carbons, preferably 3 to 8 carbon atoms, and includes such alkyl groups as ethyl, n-propyl, iso-propyl, n-butyl, iso-butyl, t-butyl, n-hexyl, n-heptyl, n-octyl, n-dodecyl, isododecyl, 2-ethylhexyl, isooctyl; or a cycloalkyl group having from 5 to 8 carbon atoms, preferably 6 carbon atoms, and includes such cycloalkyl groups as cyclopentyl, cyclohexyl, cycloheptyl, and cyclooctyl; and $n$ and $m$ are integers which are either 1 tor 2, with the total of $n$ plus $m$ equal to 3.

Illustrative phosphine catalysts are as follows:

Diphenyl ethyl phosphine
Phenyl diethyl phosphine
Diphenyl n-butyl phosphine
Phenyl di(n-butyl) phosphine
Phenyl di(n-octyl) phosphine
Diphenyl cyclohexyl phosphine
Phenyl dicyclohexyl phosphine
Cumyl dibutyl phosphine
Ethyl ditolyl phosphine
Phenyl dicyclooctyl phosphine
Phenyl dibornyl phosphine
Phenyl dipropyl phosphine
Phenyl dihexyl phosphine
Tolyl dibutyl phosphine
Tolyl dicyclohexyl phosphine Especially preferred are the monoaryl phosphines, that is, wherein n is 1. For example, outstanding improvement in conversion and yield are realized with phenyl di(n-butyl) phosphine, phenyl di(n-octyl) phosphine, and phenyl dicyclohexyl phosphine.

A variety of solvents may be employed in carrying out the improved dimerization process of this invention. Typical solvents include aromatic hydrocarbons such as benzene, p-xylene, o-xylene, m-xylene, toluene, ethylbezene, cumene, cymene and the like having from 6 to 10 carbon atoms per molecule; aliphatic ketones having from 3 to 10 carbon atoms, such as acetone, methyl isobutyl ketone, methyl ethyl ketone, and the like; aliphatic ethers having from 4 to 12 carbon atoms, such as diethyl ether, diisopropyl ether, dibutyl ether; cyclic ethers having from 4 to 12 carbon atoms, such as dioxane, tetrahydrofuran, isophorone, phorone, morpholine, n-methyl morpholine, and the like; acetonitrile; esters such as ethyl acetate, butyl acetate, and the like; and lower molecular weight alkanols having from 2 to 12 carbon atoms such as ethanol, isopropanol, t-butanol, isoamyl alcohol, t-amyl alcohol, sec-butyl alcohol, n-hexyl alcohol, 2-ethyl hexyl alcohol, octyl alcohol, decyl alcohol, and the like.

It has also been found especially useful to employ a mixture of solvents comprising an alkanol and at least one of the other aforementioned solvents. In general, the total reaction mixture, will contain from 1 to 50% by volume of the alkanol and about 0 to 94% by volume of the other solvent. The preferred concentrations range from about 2 to 30% by volume of the alkanol and about 30 to 88% by volume of the other solvent. For most purposes, the amount of the total solvent mixture employed will range from about 5 to 95% by volume, preferably 60 to 90%, based on the total volume of the reaction mixture. Illustrative solvent mixtures include t-butanol in combination with benzene, p-xylene, acetonitrile, ether, or acetone; ethanol in combination with benzene; and isopropanol in combination with benzene. The use of t-butanol in conjunction with an aromatic hydrocarbon such as benzene is especially preferred.

The phosphine catalyst may be employed in amounts ranging from about 0.02 to 10% by weight, and preferably about 0.1 to 1% by weight, based on the weight of the acrylonitrile. Excess catalyst should be avoided since under such conditions increased amounts of undesirable polymer may be produced. It will be understood, however, that only catalytic amounts of the phosphine need be employed.

In accordance with another feature of this invention, it has been found useful to employ reaction temperatures which range from about 0° to 150° C., preferably from about 20° to 60° C. At lower temperatures conversions and yields of the desired unsaturated dinitriles drop off markedly. When higher temperatures are used conversions decrease with no significant change in the ratio of dimer to polymer.

The pressure employed in carrying out the improved dimerization process of this inventon is not critical and may vary over a wide range. Thus, for example, the pressure may range from atmospheric to as high as 100 atmospheres without encountering undesirable results.

A polymerization inhibitor such as p-tertiarybutyl catechol may also be employed in the reaction mixture. It will be understood, however, that the use of a polymerization inhibitor is not required in practicing the dimerization process of this invention. When an inhibitor is employed the amount may range from about 0.001 to 0.5% by weight based on the weight on the acrylonitrile compound employed as the starting material.

The dimerization reaction of this invention is generally accomplished in about 2 to 24 hours, and the reaction is preferably carried out in a time period of about 5 to 15 hours.

The acrylonitrile compounds which are especially useful as starting materials in the dimerization process are compounds having the formula:

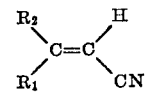

wherein $R_1$ and $R_2$ may be either hydrogen, alkyl radicals or aryl groups having 1 to 10 carbon atoms, or any radicals or groups having 1 to 10 carbon atoms. Although the preferred starting material is acrylonitrile itself, other suitable acrylonitrile compounds include beta-substituted derivatives such as crotononitrile, cinnamonitrile, and the like. For purposes of convenience, the present invention will hereinafter be described and illustrated utilizing acrylonitrile as the starting material for the preparation of 2-methylene glutaronitrile. In general, the amount of acrylonitrile compound employed in the reaction mixture will range from about 5 to 95%, and preferably 10 to 40%, by volume based on the total volume of the reaction mixture.

In general, the improved dimerization process is carried out by rapidly adding the acrylonitrile, either alone or admixed with the solvent mixture, to a rapidly stirred, dilute solution of the catalyst in the absence of oxygen and water. The time required for the addition should be within the range of about 0.1 to 2 hours. It is also possible to add all of the catalyst at one time to the total mixture of acrylonitrile and solvent. During this period it is preferred to maintain the reaction temperature fairly constant and within the aforedisclosed range.

When the reaction is complete, the catalyst is neutralized by the addition of an acid, preferably an organic acid such as sebacic or propionic acids or by exposure to oxygen, e.g., exposure to air. The solvent mixture and unreacted acrylonitrile are then removed by distillation, with the temperature preferably being maintained below about 100° C. After removal of solvent, the dimer is distilled from the residue at a pressure of less than 20 mm. Hg.

It will be understood that the above method of recovering the unsaturated dimer from the reaction product mixture is not a critical feature of this invention and that other recovery methods may be employed without departing from the broad aspects of this invention. Moreover, recovery methods may be employed which include catalyst, acrylonitrile and solvent mixture recycling.

The invention will be more fully understood by reference to the following illustrative embodiments.

EXAMPLE

A series of acrylonitrile (AN) dimerization runs, set forth in Table A, were carried out with the described phosphine catalysts, solvent systems, catalyst concentrations, temperatures, etc. Comparative results are indicated by the conversion, given in grams per gram of catalyst, and the yields of 2-methylene glutaronitrle (MGN) and by-product polymer, also expressed in grams per gram of catalyst.

The dimerization process involved admixing acrylonitrile and solvent in an amber bottle, flushing with nitrogen, then adding the catalyst by injection through a serum stopper. One ml. of a solution of the catalyst in benzene to 50 ml. of the acrylonitrile solution. The mixture was allowed to stand in a water bath after an initial brief mixing. After 24 hours, the solution was analyzed by gas chromatograph for MGN and acrylonitrile content. The difference in the sum of these two and the initial acrylonitrile content was ascribed to polymer.

TABLE A.—ACRYLONITRILE (AN) AND SOLVENTS, PERCENT VOLUME

| | AN 30%, t-butanol 15%, benzene 55% | AN 30%, iso-propanol 15%, benzene 55% | AN 30%, ethanol 15%, benzene 55% | AN 30%, acetonitrile 70% | AN 30%, acetone 70% | AN 30%, p-xylene 55%, t-butanol 15% | AN 30%, Acetonitrile 55%, t-butanol 15% | AN 30%, acetone 55%, t-butanol 15% | AN 30%, MIBK 70% | AN 30%, ether 55%, t-butanol 15% | AN 30% benzene 70% |
|---|---|---|---|---|---|---|---|---|---|---|---|
| Triphenyl phosphine: | | | | | | | | | | | |
| Cat. conc., gm./100 ml | .2 | | | | | | | | | | .2 |
| Temp., °C | 25 | | | | | | | | | | 25 |
| Conversion | 0 | | | | | | | | | | 0 |
| Yield: | | | | | | | | | | | |
| MGN | 0 | | | | | | | | | | 0 |
| Polymer | 0 | | | | | | | | | | 0 |
| Tri(n-butyl)phosphine: | | | | | | | | | | | |
| Cat. conc., gm./100 ml | .2 | .2 | .2 | .2 | .2 | .2 | .2 | .2 | .2 | .2 | |
| Temp., °C | 25 | 25 | 25 | 25 | 25 | 25 | 25 | 25 | 25 | 25 | |
| Conversion | 15.7 | | 12.0 | 11.1 | 11.1 | 11.1 | 6.1 | 7.1 | 27.1 | 32.4 | |
| Yield: | | | | | | | | | | | |
| MGN | 8.0 | 8.2 | 9.3 | 3.6 | 3.8 | 7.9 | 1.8 | 3.7 | 8.3 | 4.7 | |
| Polymer | 7.7 | | 2.7 | 7.5 | 7.3 | 4.2 | 4.3 | 3.4 | 18.8 | 27.7 | |
| Phenyl di(n-butyl) phosphine: | | | | | | | | | | | |
| Cat. conc., gm./100 ml | .2 | .067 | .067 | .067 | .067 | .067 | .067 | .067 | .067 | | |
| Temp., °C | 25 | 25 | 25 | 25 | 25 | 25 | 25 | 25 | 25 | 25 | |
| Conversion | 71 | 105 | 197 | 126 | 74 | 18 | 78 | 61 | 34 | 63 | |
| Yield: | | | | | | | | | | | |
| MGN | 60 | 87 | 51 | 62 | 44 | 8 | 68 | 50 | 15 | 41 | |
| Polymer | 11 | 10 | 146 | 64 | 32 | 10 | 10 | 11 | 19 | 22 | |
| Phenyl dicyclohexyl phosphine: | | | | | | | | | | | |
| Cat. conc., gm./100 ml | .186 | | | | | | | | | | |
| Temp., °C | 25 | | | | | | | | | | |
| Conversion | 25 | | | | | | | | | | |
| Yield: | | | | | | | | | | | |
| MGN | 21 | | | | | | | | | | |
| Polymer | 4 | | | | | | | | | | |
| Phenyl di(n-octyl) phosphine: | | | | | | | | | | | |
| Cat. conc., gm./100 ml | .2 | | | .2 | .2 | | .2 | | | | .048 |
| Temp., °C | 25 | | | 25 | 25 | | 25 | | | | 25 |
| Conversion | 44 | | | 58 | 37 | | 37 | | | | |
| Yield: | | | | | | | | | | | |
| MGN | 25 | | | 16 | 9 | | 25 | | | | 68 |
| Polymer | 19 | | | 42 | 28 | | 12 | | | | |
| Tri(n-octyl)phosphine: | | | | | | | | | | | |
| Cat. conc., gm./100 ml | .2 | .2 | .2 | .2 | .2 | .2 | .2 | .2 | .2 | .2 | |
| Temp., °C | 25 | 25 | 25 | 25 | 25 | 25 | 25 | 25 | 25 | 25 | |
| Conversion | 9.5 | 13.1 | 6.6 | 23.3 | 45 | 3.1 | 4.1 | 12.0 | 14.7 | 12.6 | |
| Yield: | | | | | | | | | | | |
| MGN | 3.2 | 1.1 | 1.1 | .5 | 1.0 | 1.7 | .2 | .9 | 1.4 | 2.1 | |
| Polymer | 6.3 | 12.0 | 5.5 | 22.8 | 44.0 | 104 | 3.9 | 11.1 | 13.3 | 10.5 | |

The above data show that the use of aryl alkyl phosphine or aryl cycloalkyl phosphine catalysts lead to increased yields of 2-methylene glutaronitrile as well as higher conversions. It is also demonstrated that the solvent is preferably a mixture of a low molecular weight alkanol, especially t-butanol, and an aromatic hydrocarbon such as benzene. The data further show that the use of the monoaryl dialkyl and monoaryl dicycloalkyl phosphine catalysts is especially preferred.

While particular embodiments of the dimerization process of this invention are set forth above, it will be understood that the invention is obviously subject to variations and modifications without departing from its broader aspects.

What is claimed is:

1. A process for the production of 2-methylene glutaronitrile which comprises heating at a temperature within the range of about 0° to 150° C. a reaction mixture comprising a minor amount of acrylonitrile and a major amount of an inert solvent admixture of a low molecular weight alkanol and an aromatic hydrocarbon having from 6 to 12 carbon atoms in the presence of a catalytic amount of a phosphine compound having the formula $$(A)_n(B)_mP$$

wherein A is an aryl radical having from 6 to 10 carbon atoms, B is a radical selected from the group consisting of alkyl radicals having from 2 to 12 carbon atoms and cycloalkyl radicals having from 5 to 8 carbon atoms, $n$ and $m$ are integers of 1 to 2 wherein the total of $n$ plus $m$ equals 3.

2. The process of claim 1 wherein said temperature is within the range of about 20° to 60° C.

3. The process of claim 1 wherein said phosphine catalyst is phenyl di(n-butyl) phosphine.

4. The process of claim 1 wherein said phosphine catalyst is phenyl di(n-octyl) phosphine.

5. The process of claim 1 wherein said phosphine catalyst is phenyl dicyclohexyl phosphine.

6. The process of claim 1 wherein said alkanol is tertiary butanol.

7. The process of claim 1 wherein said solvent admixture contains from about 2 to 30% by volume of the alkanol and from about 30 to 88% by volume of the aromatic hydrocarbon.

8. The process for the production of 2-methylene-glutaronitrile which comprises dimerizing acrylonitrile in the presence of a catalytic amount of a phenyl—$P(R_1)(R_2)$ wherein $R_1$ is phenyl, alkyl or cycloalkyl and $R_2$ is alkyl or cycloalkyl.

References Cited

Takashina et al., J.A.C.S., 84 (1962), p. 489–491, QD–1–A5.

JOSEPH PAUL BRUST, Primary Examiner

U.S. Cl. X.R.

260—465